US008200351B2

(12) United States Patent
Kurniawati et al.

(10) Patent No.: US 8,200,351 B2
(45) Date of Patent: Jun. 12, 2012

(54) LOW POWER DOWNMIX ENERGY EQUALIZATION IN PARAMETRIC STEREO ENCODERS

(75) Inventors: Evelyn Kurniawati, Singapore (SG); Sapna George, Singapore (SG)

(73) Assignee: STMicroelectronics Asia PTE., Ltd., Singapore (SG)

( * ) Notice: Subject to any disclaimer, the term of this patent is extended or adjusted under 35 U.S.C. 154(b) by 1200 days.

(21) Appl. No.: 12/006,096

(22) Filed: Dec. 28, 2007

(65) Prior Publication Data

US 2008/0199014 A1 Aug. 21, 2008

Related U.S. Application Data

(60) Provisional application No. 60/878,878, filed on Jan. 5, 2007.

(51) Int. Cl.
*G06F 17/00* (2006.01)

(52) U.S. Cl. .......... 700/94; 381/104; 381/106; 381/107; 381/108; 381/119

(58) Field of Classification Search ..................... 700/94
See application file for complete search history.

(56) References Cited

U.S. PATENT DOCUMENTS

| | | | | |
|---|---|---|---|---|
| 2005/0195995 | A1* | 9/2005 | Baumgarte | 381/104 |
| 2006/0115100 | A1* | 6/2006 | Faller | 381/119 |
| 2006/0147046 | A1* | 7/2006 | Kasargod et al. | 381/1 |
| 2007/0016406 | A1* | 1/2007 | Thumpudi et al. | 704/205 |
| 2007/0016427 | A1* | 1/2007 | Thumpudi et al. | 704/500 |
| 2007/0127733 | A1* | 6/2007 | Henn et al. | 381/80 |
| 2007/0140499 | A1* | 6/2007 | Davis | 381/23 |
| 2007/0223740 | A1* | 9/2007 | Reams | 381/119 |
| 2007/0239295 | A1* | 10/2007 | Thompson et al. | 700/94 |
| 2007/0269063 | A1* | 11/2007 | Goodwin et al. | 381/310 |
| 2009/0164222 | A1* | 6/2009 | Kim et al. | 704/500 |
| 2011/0013790 | A1* | 1/2011 | Hilpert et al. | 381/300 |

* cited by examiner

*Primary Examiner* — Curtis Kuntz
*Assistant Examiner* — Paul McCord

(57) ABSTRACT

A method and audio device are presented that preserve mono energy during downmixing of a hybrid coding process of an audio signal. The method includes calculating a stereo scaling factor in a group level that is definable within a stereo band. The method may also include updating the stereo scaling factor using an update rate and synchronizing the update rate of a spatial parameter during a fast changing transient portion of the signal. A number of groups in a first stereo band may be greater than a number of groups in a second stereo band, and the first stereo band may be a lower frequency band than the second band or may be perceptually more important than the second band.

18 Claims, 8 Drawing Sheets

400

LOW POWER DOWNMIX ENERGY EQUALIZATION IN PARAMETRIC STEREO ENCODERS

CROSS-REFERENCE TO RELATED APPLICATION AND CLAIM OF PRIORITY

The present application is related to U.S. Provisional Patent No. 60/878,878, filed Jan. 5, 2007, entitled "LOW POWER DOWNMIX ENERGY EQUALIZATION IN PARAMETRIC STEREO ENCODERS". U.S. Provisional Patent No. 60/878,878 is assigned to the assignee of the present application and is hereby incorporated by reference into the present disclosure as if fully set forth herein. The present application hereby claims priority under 35 U.S.C. §119(e) to U.S. Provisional Patent No. 60/878,878.

TECHNICAL FIELD

This disclosure relates generally to encoders and more specifically to hybrid encoders.

BACKGROUND

Digital audio transmission requires a considerable amount of memory and bandwidth. To achieve an efficient transmission, signal compression techniques need to be employed. Efficient coding systems are those that are capable of optimally eliminating irrelevant and redundant parts of an audio stream. For example, the former of the two, is achieved by reducing psycho acoustical irrelevancy through psychoacoustics analysis. As another example, the latter of the two is accomplished by modeling the signal using a set of functions or through a prediction tool.

Generally, there are two conventional coding approaches used for compression purposes. The first is approach is typically transform coding, while the second is approach is typically parametric coding. Conventional transform coders use the frequency domain representations of the signal to perform psychoacoustics analysis and allocate the quantization noise below the noticeable level of human auditory systems. Conventional parametric coders, on the other hand, decompose signals into parameterized components. Accordingly, only these parameters are subsequently coded.

Transform coders typically operate at a much higher bit rates and exhibit higher qualities than conventional parametric coders. Some examples of transform coder are MPEG layer 1 to layer 3, MPEG-AAC etc., all of which require around 128 kbps for a good stereo quality. Parametric coders typically have an operating bit rate below 32 kbps. An example of a typical parametric coder is a MPEG-HILN coder. Some conventional high quality encoding efforts combine the two approaches above and generally result in a "hybrid" coder.

An enhanced AAC plus coder is a conventional example of hybrid coder. Enhanced AAC plus coders typically combine a transform coder (AAC) with parameterized high frequency components (also generally known as Spectral Band Replication) and parametric stereo coder. A set of spatial parameters is firstly extracted from a stereo streams. After which, a stereo to mono downmix is performed, and the mono stream is passed to the core transform coder. In the case of enhanced AAC plus, further parameterization is done to represent the high frequency component of this mono stream, and only the lower half of the mono streams is processed by the core transform coder. MP3 pro uses a similar scheme with MP3 as the core transform coder.

The scheme to represent stereo audio as monaural downmix and a set of spatial parameters which describe the original stereo image is commonly known as Parametric Stereo (PS). FIG. 1 depicts the general structure of a conventional MPEG parametric stereo encoder 100. One frame consisting of 2048 time domain audio samples at both channels is filtered by a 64-band complex-modulated quadrature mirror filter (QMF) followed by down-sampling by a factor of 64. To increase the resolution in the lower frequency region where human ears are most sensitive, further filtering is performed to the first few lower frequency channels to get a total of 71 complex-subband samples. These hybrid filtering results are then grouped non-linearly into 20 stereo bands to follow the equivalent rectangular bandwidth (ERB) with an increasing/coarser bandwidth towards the higher frequency. A set of spatial parameters is extracted from each stereo band and differentially coded into the bit stream. These parameters are IID (Interchannel Intensity Difference), IC (Interchannel Coherence), IPD (Interchannel Phase Difference) and OPD (Overall Phase Difference).

Interchannel intensity difference is defined as the logarithm of the power ratio between the two channels as shown in Equation 1 below.

$$IID[b] = 10\log_{10}\frac{\sum_{n=0}^{n=31}\sum_{k=k_b}^{k_{b+1}-1} l(k,n)l^*(k,n)}{\sum_{n=0}^{n=31}\sum_{k=k_b}^{k_{b+1}-1} r(k,n)r^*(k,n)} \quad \text{(Eqn. 1)}$$

In Equation 1, l and r are the left and right channel complex subband sample, respectively. In addition, k is the frequency channel index, n is the subband sample index, and b is the stereo band index.

The interchannel coherence is defined as the normalized cross-correlation coefficient after phase alignment according to the IPD as shown in Equation 2 below.

$$IC[b] = \frac{\left|\sum_{n=0}^{n=31}\sum_{k=k_b}^{k_{b+1}-1} l(k,n)r^*(k,n)\right|}{\sqrt{\left(\sum_{n=0}^{n=31}\sum_{k=k_b}^{k_{b+1}-1} l(k,n)l^*(k,n)\right)\left(\sum_{n=0}^{n=31}\sum_{k=k_b}^{k_{b+1}-1} r(k,n)r^*(k,n)\right)}} \quad \text{(Eqn. 2)}$$

When the phase parameters are not used, the IC alone should represent the phase or time difference between the two channels. In this case, the IC is defined as shown in Equation 3 below.

$$IC[b] = \frac{\mathrm{Re}\left\{\sum_{n=0}^{n=31}\sum_{k=k_b}^{k_{b+1}-1} l(k,n)r^*(k,n)\right\}}{\sqrt{\left(\sum_{n=0}^{n=31}\sum_{k=k_b}^{k_{b+1}-1} l(k,n)l^*(k,n)\right)\left(\sum_{n=0}^{n=31}\sum_{k=k_b}^{k_{b+1}-1} r(k,n)r^*(k,n)\right)}} \quad \text{(Eqn. 3)}$$

IPD and OPD are the phase difference between the two channels and between the left and the mono downmix, respectively, as shown in Equations 4 and 5 below.

$$IPD[b] = \angle\left(\sum_{n=0}^{n=31}\sum_{k=k_b}^{k_{b+1}-1} l(k,n)r^*(k,n)\right) \quad \text{(Eqn. 4)}$$

$$OPD[b] = \angle\left(\sum_{n=0}^{n=31}\sum_{k=k_b}^{k_{b+1}-1} l(k,n)m^*(k,n)\right) \quad \text{(Eqn. 5)}$$

The mono downmix stream m(k,n) is defined as a linear combination of the left and right channel as shown in Equation 6.

$$m(k,n)=w_1 l(k,n)+w_2 r(k,n) \quad \text{(Eqn. 6)}$$

In Equation 6, w1 and w2 are the weights to determine the content of each of the channel in the mono downmix signal. Generally, w1 and w2 are set to 0.5 to have an output that is the average of the two channels. However, this scheme bears the risk that the power of the downmix signal strongly depends on the cross correlation of the two input signals. The resulting monaural signal can be further processed or synthesized back into time domain and passed to a conventional mono audio coder.

There is therefore a need for a method and system of providing an alternative low power implementation of a hybrid encoder, for example, in the parametric stereo encoder portion.

SUMMARY

Aspects of the disclosure may be found in a method of preserving mono energy during downmixing of a hybrid coding process of an audio signal. The method includes calculating a stereo scaling factor in a group level that is definable within a stereo band. The method may also include updating the stereo scaling factor using an update rate and synchronizing the update rate of a spatial parameter during a fast changing transient portion of the signal. A number of groups in a first stereo band may be greater than a number of groups in a second stereo band, and the first stereo band may be a lower frequency band than the second band or may be perceptually more important than the second band.

Other aspects of the disclosure may be found in an audio device that includes an audio input device and an audio encoder. The audio input device is operable to receive an input signal and produce an audio signal. The audio encoder is operable to receive the audio signal and produce a compressed audio signal. The audio encoder is also operable to downmix the audio signal by calculating a stereo scaling factor in a group level which is definable within a stereo band. The audio encoder may be further operable to update the stereo scaling factor using an update rate and synchronize the update rate of a spatial parameter during a fast changing transient portion of the signal. A number of groups in a first stereo band may be greater than a number of groups in a second stereo band, and the first stereo band may be a lower frequency band than the second band or may be perceptually more important than the second band.

In one embodiment, the present disclosure provides a hybrid encoder that combines a high quality transform coder with a very low bit rate parametric coder that reduces the complexity of a hybrid coder by offering an alternative energy equalization method for stereo to mono downmix process. The hybrid encoder may be adapted to handle transient signal by following the increasing rate of spatial parameter update during transient portion. Scalability of complexity reduction and quality may be achieved by controlling the update rate of the stereo scaling factors. Accordingly, the hybrid encoder may reduce the complexity up to 23 percent and is applicable to conventional hybrid coder where low computational complexity is required.

In another embodiment, the present disclosure provides a method of parametric stereo coding where the mono energy is preserved during the downmixing process of a signal. The method includes calculating a stereo scaling factor in a group level which is definable within a stereo band.

In still another embodiment, the present disclosure provides a parametric stereo encoder incorporating every feature shown and described. In yet another embodiment, the present disclosure provides a system incorporating every feature shown and described. In still another embodiment, the present disclosure provides a method incorporating every feature shown and described.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

One embodiment of the present disclosure provides an alternative low power implementation of a hybrid encoder.

$$m(k,n)=\frac{l(k,n)+r(k,n)}{2}\cdot\gamma(k,n) \quad \text{(Eqn. 7)}$$

Figure 2:
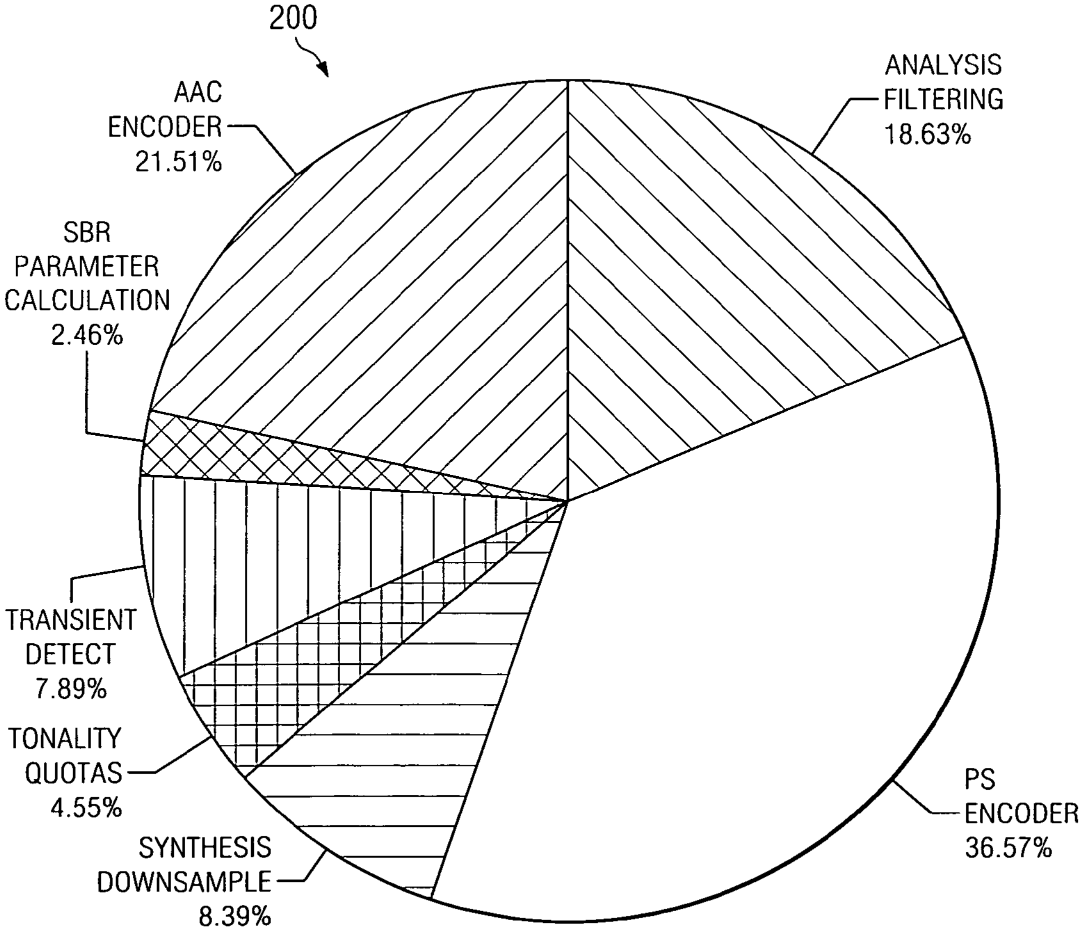
FIG. 2 generally depicts a conventional complexity analysis of eAAC+ encoder.

FIG. 2 generally depicts the complexity analysis 200 of a conventional implementation of an enhanced AAC+ encoder from the $3^{rd}$ rd Generation Partnership Project (3GPP) for a 48 kHz stream operating at 32 kbps. Parametric stereo occupies 36 percent (%) of the encoding task, the highest among the other tasks mostly because of the high complexity of parametric stereo encoding in generating the monaural stream. In order to preserve the power of the downmix signal, a stereo scaling factor is used such that the power of the downmix signal is equal to the sum of the two channel signals as generally shown by Equation 7.

To further define the relationship exemplified by Equation 8 below, the stereo scaling factor is defined as shown in Equation 9 below.

$$|m(k,n)|^2=\frac{|l(k,n)|^2+|r(k,n)|^2}{2} \quad \text{(Eqn. 8)}$$

$$\gamma(k,n)=\sqrt{\frac{|l(k,n)|^2+|r(k,n)|^2}{0.5|l(k,n)+r)k,n)|^2}} \quad \text{(Eqn. 9)}$$

This scaling factor is calculated for all subband samples (index n) in each of the frequency channel (index k). This equalization technique aids in preventing attenuation or amplification of signal components. However, for an encoder with a very tight processing power or delay requirement, the value of γ(k,n) is maintained as one to avoid the calculation exemplified by Equation 9 and known as passive downmix. With this complexity scheme 300, the complexity of the encoder is reduced by 27 percent (%) as shown in FIG. 3.

Figure 3:
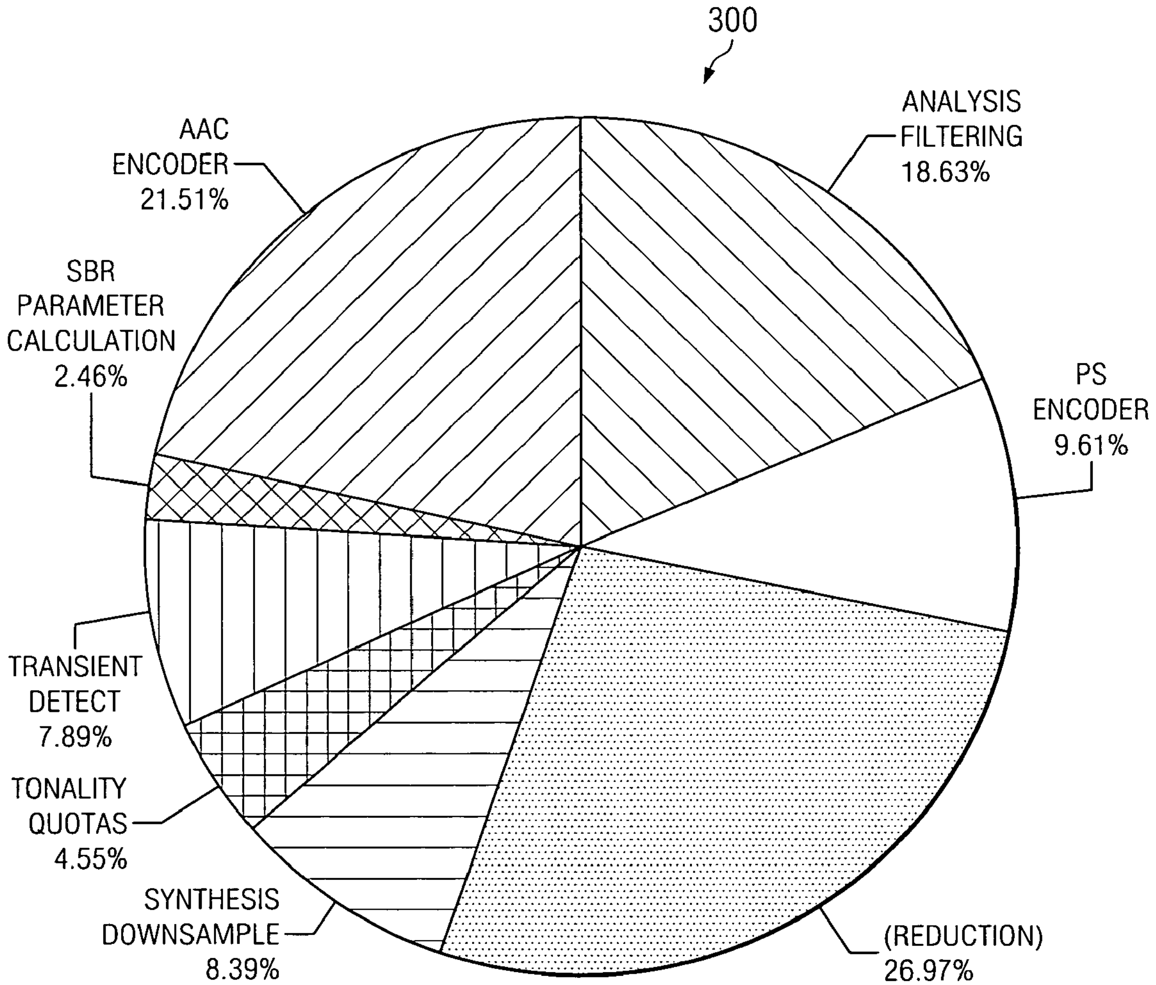
FIG. 3 generally depicts a conventional complexity reduction of eAAC+ encoder with passive downmix.

The above-described scheme in FIG. 3, however, is susceptible to signal loss and coloration, which can degrade the quality of the resulting audio. In one embodiment, the present disclosure provide a system and method to achieve similar complexity reduction as passive downmix method while sustaining as much as possible the quality of the downmix scheme with energy equalization.

Conventional binaural auditory systems generally have limited resolution across both time and frequency. With this in mind, the energy equalization requirement exemplified by Equation 8 above is modified to include a more tolerant constraint as shown by Equation 10 below.

$$\sum_{c=0}^{c_{total}-1}\sum_{n=n_c}^{n_{c+1}-1}\sum_{k=k_b}^{k_{b+1}-1}|m(k,n)|^2=\frac{\sum_{c=0}^{c_{total}-1}\sum_{n=n_c}^{n_{c+1}-1}\sum_{k=k_b}^{k_{b+1}-1}|l(k,n)|^2+|r(k,n)|^2}{2}\quad\text{where } n_c=\frac{32c}{c_{total}} \quad \text{(Eqn. 10)}$$

In Equation 10, $C_{total}$ is the number of desired time segment within one frame. This constant, $C_{total}$, determines the time resolution of the scheme. Instead of having to preserve the individual spectral power in the mono downmix signal, the stereo scaling factor is made generic for a definable group of spectral lines within one stereo band b. The stereo scaling factor is redefined as shown in Equation 11.

$$\gamma(b,c)=\sqrt{\frac{\sum_{c=0}^{c_{total}-1}\sum_{n=n_c}^{n_{c+1}-1}\sum_{k=k_b}^{k_{b+1}-1}|l(k,n)|^2+|r(k,n)|^2}{2\sum_{c=0}^{c_{total}-1}\sum_{n=n_c}^{n_{c+1}-1}\sum_{k=k_b}^{k_{b+1}-1}\left|\frac{l(k,n)+r(k,n)}{2}\right|^2}} \quad \text{(Eqn. 11)}$$

Equation 11 may also be expressed as Equations 12a and 12b below.

$$\gamma(b,c)=\sqrt{\frac{2\sum_{c=0}^{c_{total}-1}\sum_{n=n_c}^{n_{c+1}-1}\sum_{k=k_b}^{k_{b+1}-1}l(k,n)l^*(k,n)+r(k,n)r^*(k,n)}{\sum_{c=0}^{c_{total}-1}\sum_{n=n_c}^{n_{c+1}-1}\sum_{k=k_b}^{k_{b+1}-1}l(k,n)l^*(k,n)+r(k,n)r^*(k,n)+2\mathrm{Re}(l(k,n)r^*(k,n))}} \quad \text{(Eqn. 12a)}$$

$$\gamma(b,c)=\sqrt{\frac{2\left(\sum_{c=0}^{c_{total}-1}\sum_{n=n_c}^{n_{c+1}-1}\sum_{k=k_b}^{k_{b+1}-1}l(k,n)l^*(k,n)+\sum_{c=0}^{c_{total}-1}\sum_{n=n_c}^{n_{c+1}-1}\sum_{k=k_b}^{k_{b+1}-1}r(k,n)r^*(k,n)\right)}{\sum_{c=0}^{c_{total}-1}\sum_{n=n_c}^{n_{c+1}-1}\sum_{k=k_b}^{k_{b+1}-1}l(k,n)l^*(k,n)+r(k,n)r^*(k,n)+2\sum_{c=0}^{c_{total}-1}\sum_{n=n_c}^{n_{c+1}-1}\sum_{k=k_b}^{k_{b+1}-1}\mathrm{Re}(l(k,n)r^*(k,n))}} \quad \text{(Eqn. 12b)}$$

This is where the computational reduction is obtained. Because the scaling factor needs to be calculated, $C_{total}$ times per stereo band, its calculation can also be derived from the parameter extraction process shown below, where values may be substituted by the variables: A, B, C and D.

$$\text{Let } A=\sum_{c=0}^{c_{total}-1}\sum_{n=n_c}^{n_{c+1}-1}\sum_{k=k_b}^{k_{b+1}-1}l(k,n)l^*(k,n)$$

$$B=\sum_{c=0}^{c_{total}-1}\sum_{n=n_c}^{n_{c+1}-1}\sum_{k=k_b}^{k_{b+1}-1}r(k,n)r^*(k,n)$$

$$C=\sum_{c=0}^{c_{total}-1}\sum_{n=n_c}^{n_{c+1}-1}\sum_{k=k_b}^{k_{b+1}-1}l(k,n)l^*(k,n)+r(k,n)r^*(k,n)=A+B$$

$$D=\sum_{c=0}^{c_{total}-1}\sum_{n=n_c}^{n_{c+1}-1}\sum_{k=k_b}^{k_{b+1}-1}\mathrm{Re}(l(k,n)r^*(k,n))$$

Thus, using the relationships shown above for A, B, C and D, the scaling factor can be expressed as Equation 12c below.

$$\gamma(b,c)=\sqrt{\frac{2(A+B)}{C+2D}} \quad \text{(Eqn. 12c)}$$

Referring to Equation 12c, the calculation of A and B can be extracted from IID calculation (Equation 1), C is readily available from the numerator calculation, and D can be extracted from IC calculation (Equations 2 or 3). Compared to passive downmixes, the extra calculations needed now are simply two additions, one division, 2 shift left operations, and one square root for every scaling factor calculated.

The highest time resolution is achieved when $C_{total}$ is set to 32. The scaling factor calculation can be expressed as shown by Equation 13 below.

$$\gamma(b,n)=\sqrt{\frac{2\sum_{k=k_b}^{k_{b+1}-1} l(k,n)l^*(k,n)+r(k,n)r^*(k,n)}{\sum_{k=k_b}^{k_{b+1}-1} l(k,n)l^*(k,n)+r(k,n)r^*(k,n)+2\sum_{k=k_b}^{k_{b+1}-1}\mathrm{Re}(l(k,n)r^*(k,n))}} \quad \text{(Eqn. 13)}$$

In this case, 15% reduction is obtained as there are 32 scaling factor computed per stereo band (Proposed A). This scheme gives the highest quality improvement. On the other hand, the highest computational saving is achieved when $C_{total}$ is set to 1. The scaling factor calculation can be expressed by Equation 14 below.

$$\gamma(b)=\sqrt{\frac{2\sum_{n=0}^{n=31}\sum_{k=k_b}^{k_{b+1}-1} l(k,n)l^*(k,n)+r(k,n)r^*(k,n)}{\sum_{n=0}^{n=31}\sum_{k=k_b}^{k_{b+1}-1} l(k,n)l^*(k,n)+r(k,n)r^*(k,n)+2\sum_{n=0}^{n=31}\sum_{k=k_b}^{k_{b+1}-1}\mathrm{Re}(l(k,n)r^*(k,n))}} \quad \text{(Eqn. 14)}$$

Figure 4:
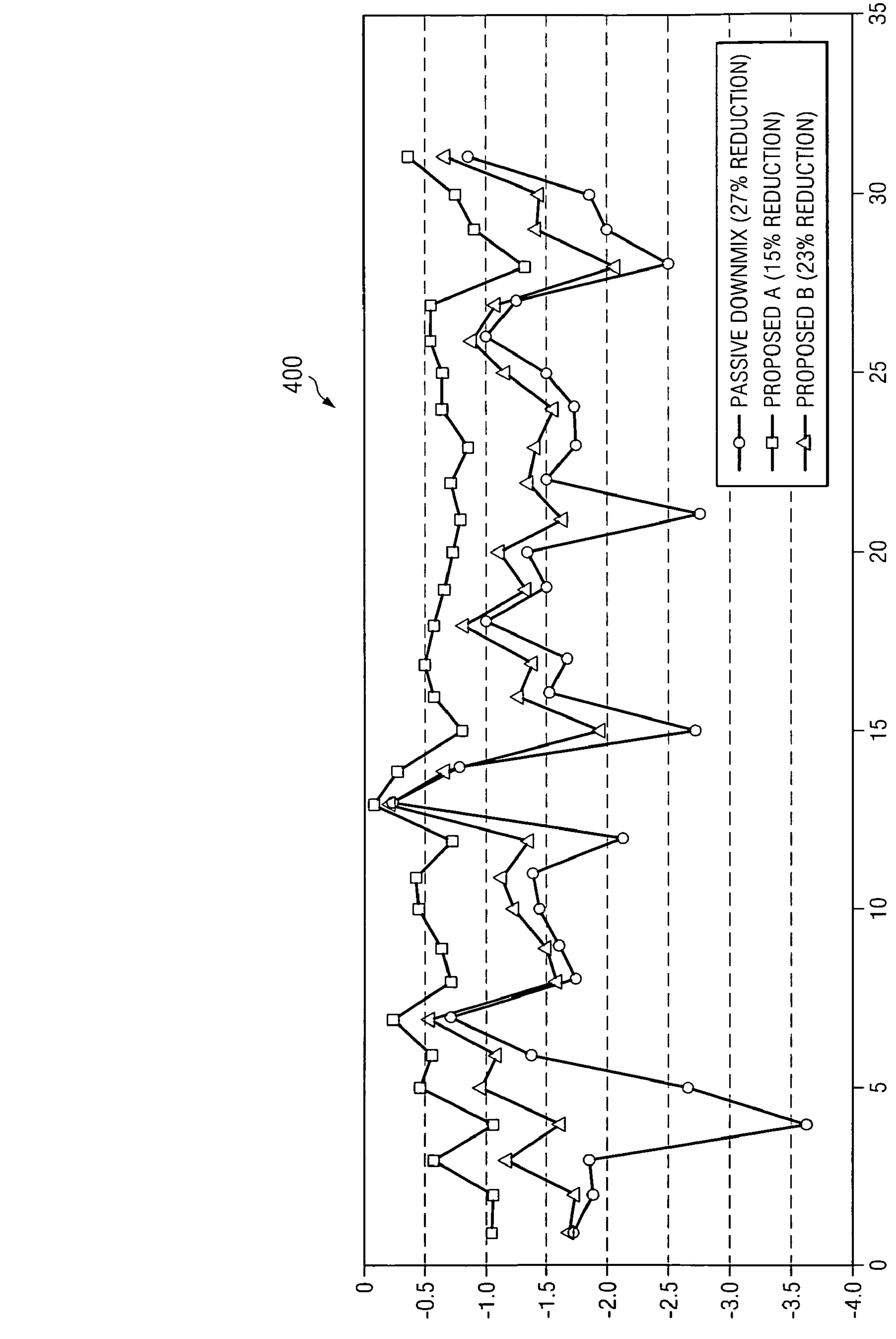
FIG. 4 generally depicts an objective quality evaluation results of passive downmix and a energy equalization scheme where "proposed A" uses 32 stereo scaling factor per stereo band and "proposed B" uses one stereo scaling factors per stereo band according to one embodiment of the present disclosure.

The complexity of this scheme (Proposed B) is similar to passive downmix in FIG. 3, but the reduction is now 23% instead of 27% due to the extra calculation performed. However, this scheme vitally improves the listening test result compared to passive downmix. An objective quality comparison is also performed using an ITU recommendation PEAQ advanced method with 31 random signal streams covering a large range of audio signal.

original downmix streams from 3GPP are used as a reference. A quality degradation 400 of passive downmix can be observed in FIG. 4. With the equalization strategy according to one embodiment of the present disclosure, the objective quality is clearly improved and the amount of improvement is proportional to the extent of complexity reduction gained.

Figure 1:
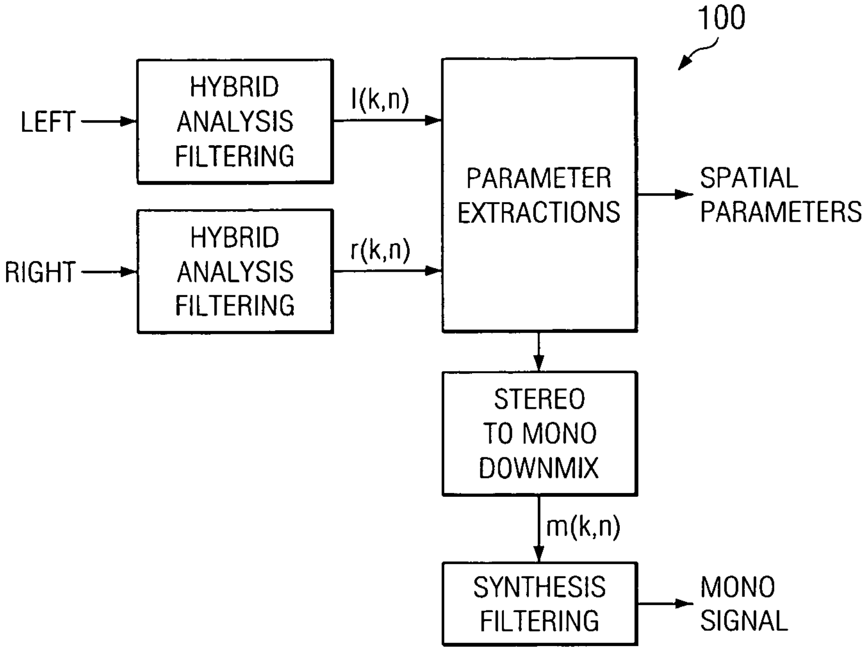
FIG. 1 generally depicts the general structure of a conventional MPEG Parametric Stereo encoder.

Referring back to FIG. 1 which depicts the conventional structure of a conventional parametric stereo encoder, the left and right streams are first passed through a hybrid analysis filter, and the spatial parameters are extracted according to Equations 1 through Equation 5 described above. In one embodiment, the present disclosure takes shape in the "stereo to mono downmix module", just before the synthesis filtering to generate the mono signal for the core encoder.

TABLE 1 below illustrates the grouping of the subband samples into 20 stereo bands.

TABLE 1

Summation Range from 71 Sub Subbands to 20 Bands

| Parameter Index b | Sub Subband Index | QMF Channel |
|---|---|---|
| 0 | 0 | 0 |
| 1 | 1 | 0 |
| 2 | 2 | 0 |
| 3 | 3 | 0 |
| 4 | 10 | 1 |
| 5 | 11 | 1 |
| 6 | 12 | 2 |
| 7 | 13 | 2 |
| 8 | 16 | 3 |
| 9 | 17 | 4 |
| 10 | 18 | 5 |
| 11 | 19 | 6 |
| 12 | 20 | 7 |
| 13 | 21 | 8 |
| 14 | 22-23 | 9-10 |
| 15 | 24-26 | 11-13 |
| 16 | 27-30 | 14-17 |
| 17 | 31-35 | 18-22 |
| 18 | 36-47 | 23-34 |
| 19 | 48-76 | 35-63 |

Figure 5:
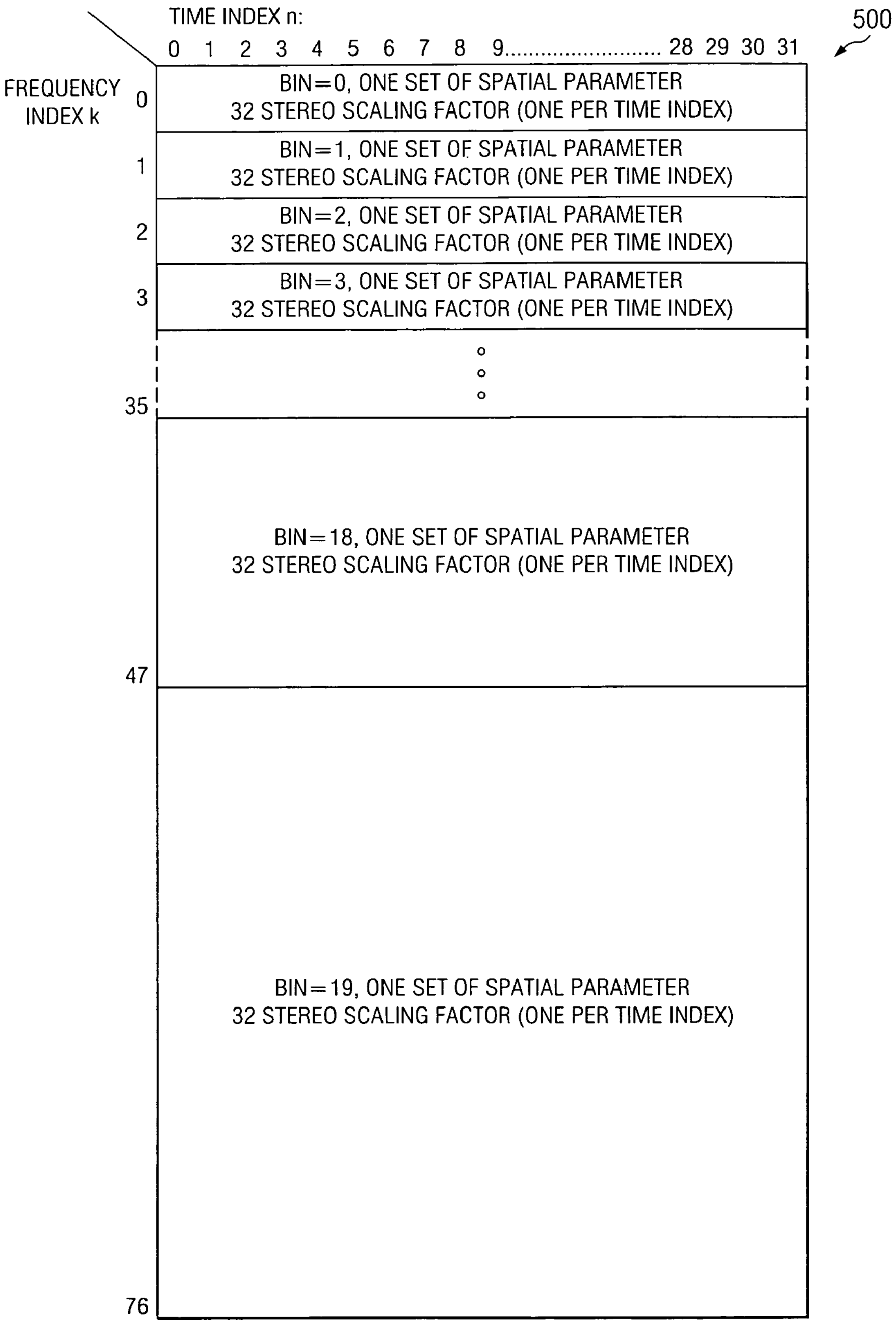
FIG. 5 is an exemplary pictorial view of the stereo scaling factor calculation with respect to the spatial parameter update rate ("proposed A") where 32 scaling factors are calculated per stereo band according to one embodiment of the present disclosure.
Figure 6:
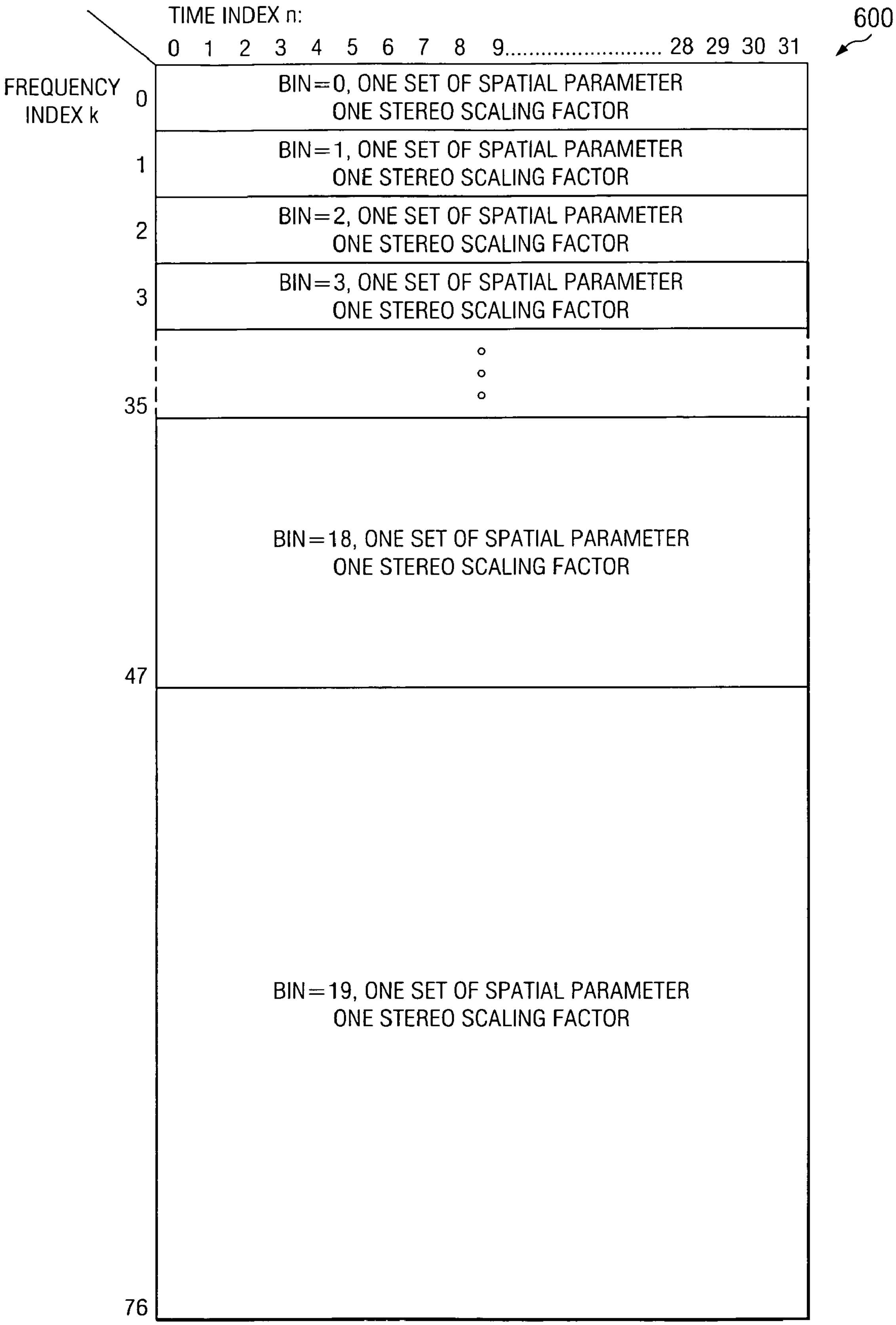
FIG. 6 is an exemplary pictorial view of the stereo scaling factor calculation with respect to the spatial parameter update rate ("proposed B") where only one scaling factor is calculated per stereo band according to one embodiment of the present disclosure.

FIGS. 5 and 6 illustrate how the spatial parameters are extracted for each of these stereo bands according to one embodiment of the present disclosure. As explained in the previous section, instead of calculating the stereo scaling factor per subband sample per frequency γ(k,n), in this embodiment of the present disclosure the scaling factor are calculated for a certain amount of time within a stereo band. FIG. 5 illustrates proposed scheme A 500 where 32 scaling factor is computed per stereo band γ(b,n), giving us the highest quality improvement according to one embodiment of the present disclosure.

FIG. 6, on the other hand, illustrates proposed scheme B 600 where only 1 stereo scaling factor is computed per band γ(b), resulting in the highest complexity reduction according to one embodiment of the present disclosure. Both schemes are shown to result in quality improvement compared to its passive downmix counterpart.

Behavior Towards Fast Changing Signals

Most if not all high quality audio encoder has special feature to handle rapidly changing or commonly known as transient signal. In the case of parametric encoding, it is done by increasing the update rate of the parameters. An MPEG parametric stereo encoder is also equipped with this option to increase the spatial parameter update rate up to 4 times. In this scenario, an equalization method according to one embodiment of the present disclosure will follow the update rate of the spatial parameters.

Figure 7:
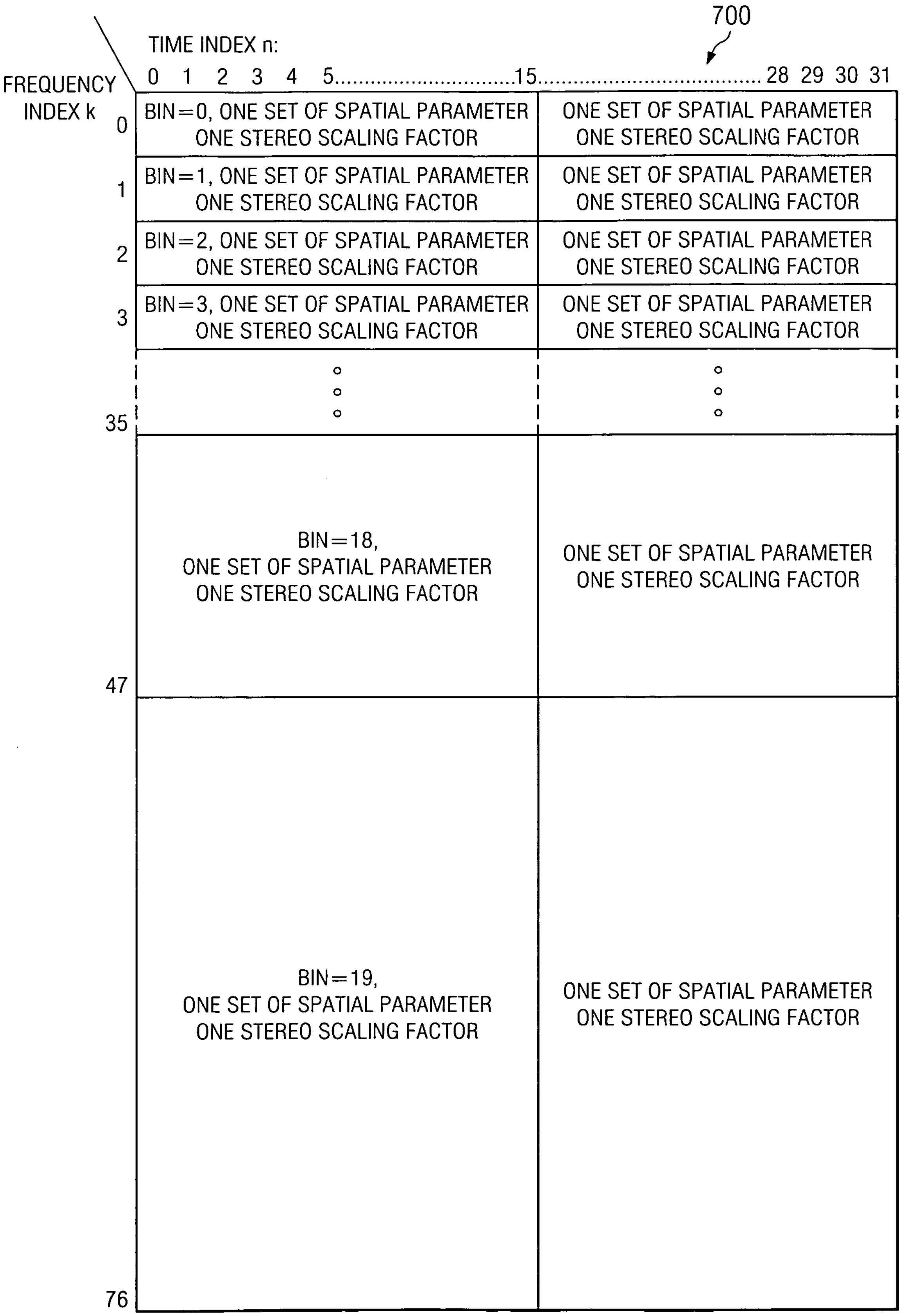
FIG. 7 generally depicts how the stereo scaling factor calculation adapts to an increase in the parameter update rate due to transient signal handling according to one embodiment of the present disclosure.

FIG. 7 illustrates how the scheme 700 adapts when the parameter update rate is increased by two per frame. In this case, two stereo scaling factors will be calculated per bin. In total there will be 40 parameters per frame (γ(b,0) and γ(b,1) for each stereo band). In one embodiment of the present disclosure, this adaptation is not applicable to proposed scheme A since it is already at the highest time resolution.

Scalability of Quality and Complexity

One embodiment of the present disclosure provides a general scheme where the stereo energy equalization condition is exemplified by Equation 10 above. This brings a considerable quality improvement compared to a simple passive downmix, which can also be observed from the objective quality evaluation results in FIG. 4.

Depending on how much quality improvement or computational saving is desired, the scheme can be adapted by choosing the right constant for $C_{total}$. This parameter controls the update rate of the stereo scaling factor. With this control, scalability of quality and complexity reduction can be obtained. The computational complexity of an encoder is often related to the sampling frequency of the input streams and the operating bit rate of the encoder. These two factors can be taken into consideration when choosing the right constant for $C_{total}$.

Psychophysical research indicates that the human ear is more sensitive in the lower frequency region than in the upper frequency region. This can also be observed in the bark scale division where frequencies are non-linearly grouped, having a coarser bandwidth toward the higher frequency. With this observation, one embodiment of the present disclosure may be modified to have a more precise mode of operation in the lower frequency region. The number of stereo scaling factor calculated can be gradually reduced toward the higher frequency. This would increase the complexity reduction as the higher stereo band contains more spectral lines than the lower ones.

In one embodiment of the present disclosure, an analysis is included to identify which of the frequency bands is most important in the signal, and increase the resolution of the stereo scaling factor parameter accordingly. For example, for a speech signal with minor background music, it is possible to have a higher stereo scaling factor update rate up to the frequency of 4 kHz to give a higher quality to the speech portion of the signal.

Figure 8:
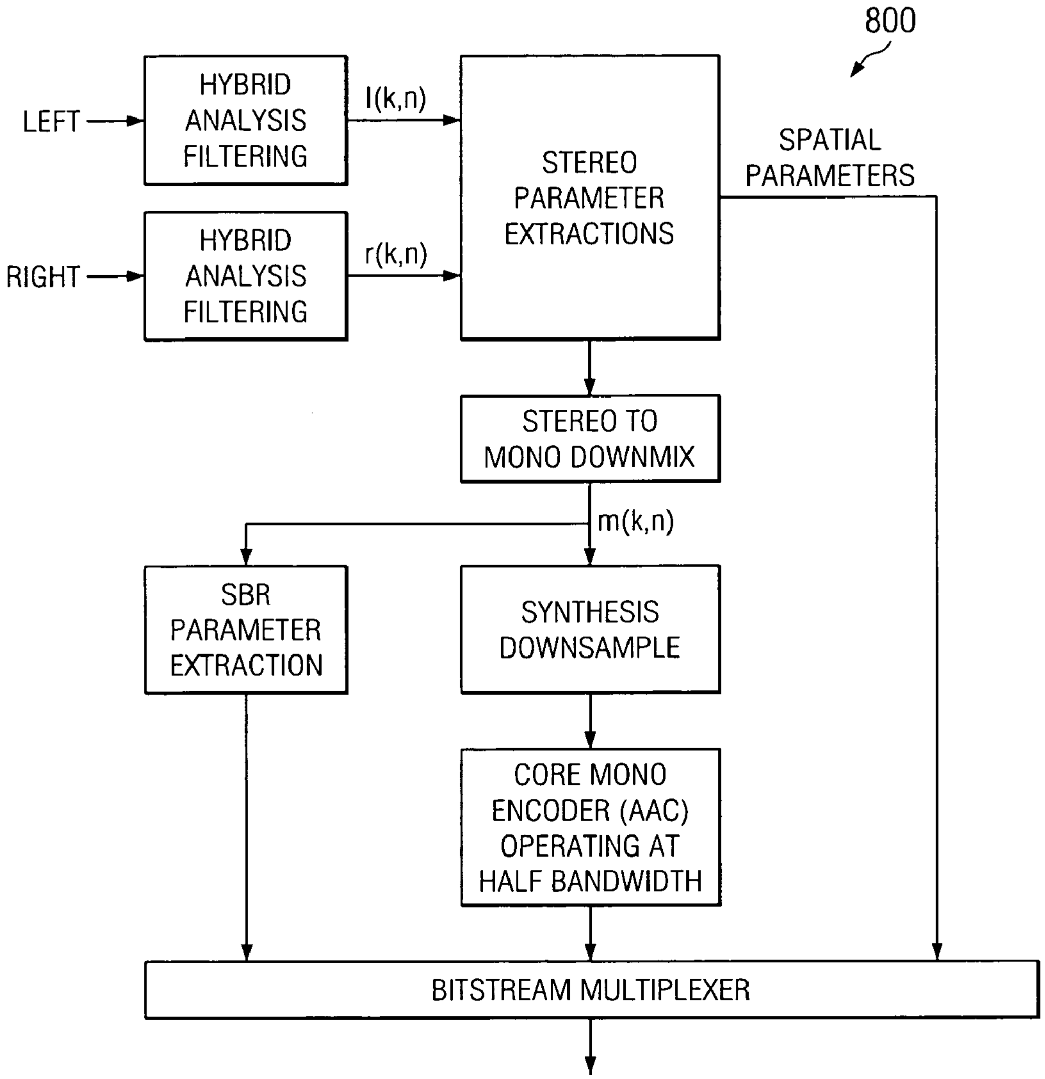
FIG. 8 generally depicts the structure of an eAAC+ encoder according to one embodiment of the present disclosure.

One embodiment of the present disclosure can be applied to any hybrid encoder which uses parameterization of its stereo components coupled with a conventional transform coder. As described in detail herein, it will be demonstrated how embodiments of the present disclosure apply to an eAAC+ encoder. The general structure of such an enhanced AAC+ encoder 800 is shown in FIG. 8.

Hybrid Analysis Filtering

Figure 9:
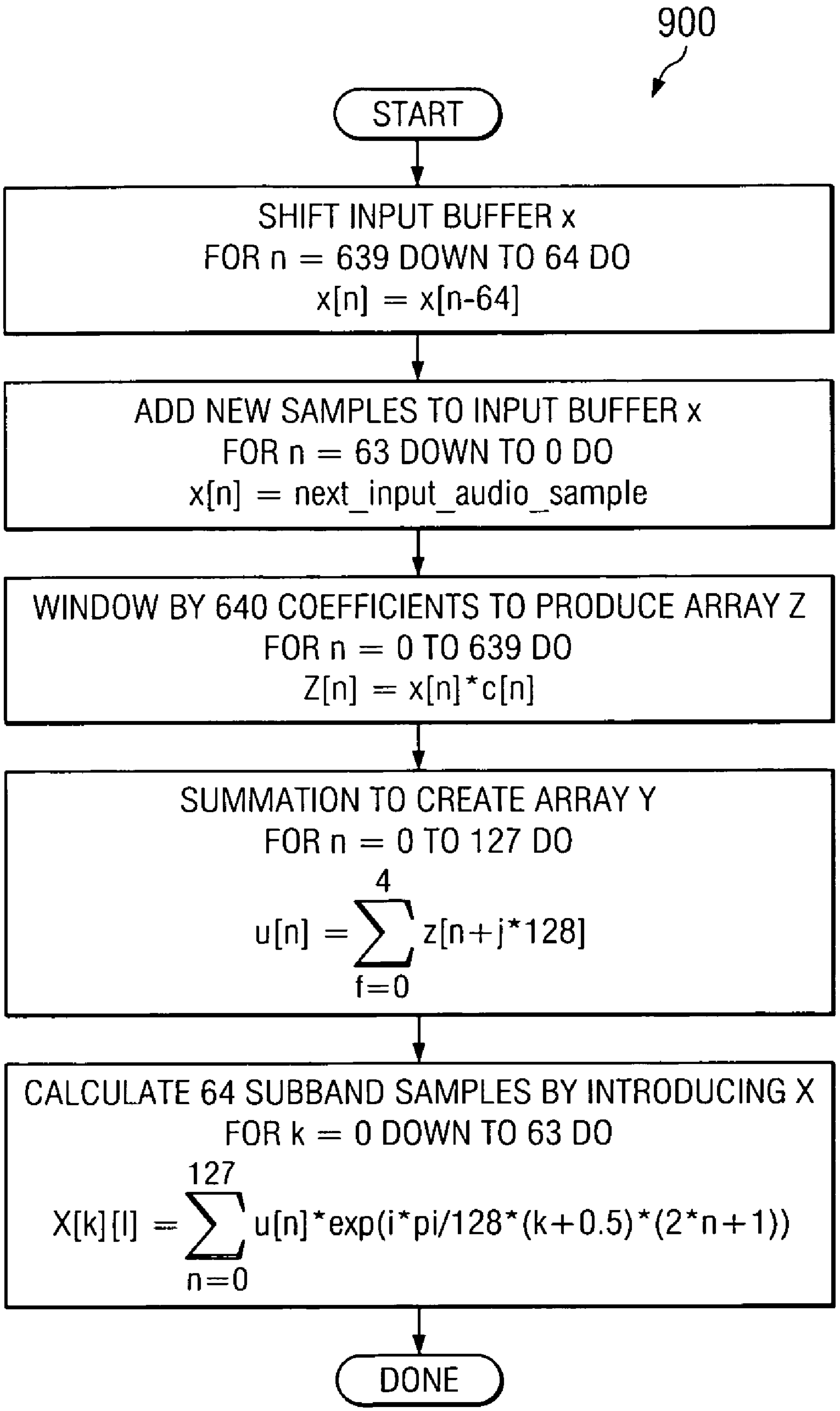
FIG. 9 is a somewhat simplified flowchart illustrating a method for the encoder analysis QMF bank according to one embodiment of the present disclosure.

The QMF analysis filterbank to process the stereo stream is shown in the exemplary process flowchart 900 found in FIG. 9. The lower QMF subbands are further split to obtain a higher frequency resolution.

The frequency bands are grouped into 20 stereo bands according to TABLE 1, and a set of spatial parameters are extracted for each of this bin. These parameters are IID, IC, IPD and OPD. After the parameter extraction, a hybrid synthesis is performed to negate the effect of the lower frequency band splitting.

Stereo to Mono Downmix

According to one embodiment of the present disclosure, a normal downmix method (e.g., as shown by Equation 7) calculates the stereo scale factor (e.g., as shown by Equation 9) for every subband sample in every frequency index. This is to ensure that the energy of the downmix signal is the same as the two channel signal. In one embodiment, a more relaxed condition described by Equation 10, where only the grouped energy within a stereo band needs to be the same as its two channel counterparts. With this consideration, the stereo scaling factor needs to be calculated only once for each of this group within the stereo band, as expressed in Equation 12. Another advantage of this scheme according to one embodiment of the present disclosure is that part of the calculation of the stereo scaling factor can be derived easily from the IID and IC parameter calculation.

In the event of a transient signal where the parameter update rate is increased, the proposed strategy simply follows the update rate of the spatial parameter without any additional complication according to one embodiment of the present disclosure. When a higher quality is desired, the scheme could increase the update rate of the stereo scaling factor. The complexity increase is proportional to number of additional scaling factor calculated. Scalable complexity and quality is achieved with this method.

SBR Parameter Extraction and Synthesis Downsample

The complex QMF sample after the downmix is passed to the Spectra Band Replication (SBR) module where parameterization of the high frequency portion of the signal is performed. At the same time, the downmix stream is also passed to synthesis downsample module. The result is time domain mono signal at half the bandwidth of the original input signal. This result is then passed to the core encoder.

Core Mono Coder: Advanced Audio Coder (AAC)

A transform coder has a much higher complexity compared to a parametric stereo coder. In hybrid encoders, however, the core coder needs only to process a mono stream at half the original input bandwidth. This reduces the task of this core coder significantly.

The three main processing algorithms performed in AAC encoder are: (1) Time to Frequency transform; (2) Psychoacoustics Model (PAM); and (3) Bit allocation-Quantization.

Time to Frequency Transform

AAC uses MDCT as its time to frequency transform engine as generally shown by Equation 15 below.

$$X_{i,k}=2\sum_{n=0}^{N-1} z_{i,n}\cos\left(\frac{2\pi}{N}(n+n_o)\left(k+\frac{1}{2}\right)\right),\ \text{for } 0\le k\le\frac{N}{2} \quad \text{(Eqn. 15)}$$

In Equation 15, z is the windowed input sequence, n is sample index, k is spectral coefficient index, i is the block index, N is window length (2048 for long and 256 for short) and $n_0$ is computed as (N/2+1)/2.

Psychoacoustics Model (PAM)

In this model, the masking threshold is calculated based on the signal energy in bark domain. The masking threshold represents the amount of noise which our ear can tolerate. This calculation is crucial because the allocation of quantization noise will be based on this threshold.

Bit Allocation-Quantization

AAC uses a non-uniform quantizer with a relationship generally given by Equation 16.

$$\text{x\_quantized}(i)=\text{int}\left[\frac{x^{\frac{3}{4}}}{2^{\frac{3}{16}(gl-scf(i))}}+0.4054\right] \quad \text{(Eqn. 16)}$$

In Equation 16, i is the scale factor band index, x is the spectral values within that band to be quantized, gl is the global scale factor (the rate controlling parameter), and scf(i) is the scale factor value (the distortion controlling parameter). With careful selection of the global and scale factor parameters, compression can be achieved by allocating the right amount of quantization noise below the masking threshold.

Bitstream Multiplexer

The parametric stereo parameter, SBR parameter and the core AAC streams are then multiplex into a valid eAAC+ stream for transmission, storage, or other purposes.

Performance

One embodiment of the present disclosure provides a method for low power downmix energy equalization in parametric stereo encoder by simplifying the criteria of stereo to mono energy preservation. This scheme can adapt to fast changing or transient signal by synchronizing with the update rate of the spatial parameters. Scalability of quality and complexity are obtained by controlling the number of time the stereo scaling factors are calculated within the stereo band. Reduction in complexity from 15% to 23% is achievable with quality that is much better than passive downmix scheme.

Figure 10:
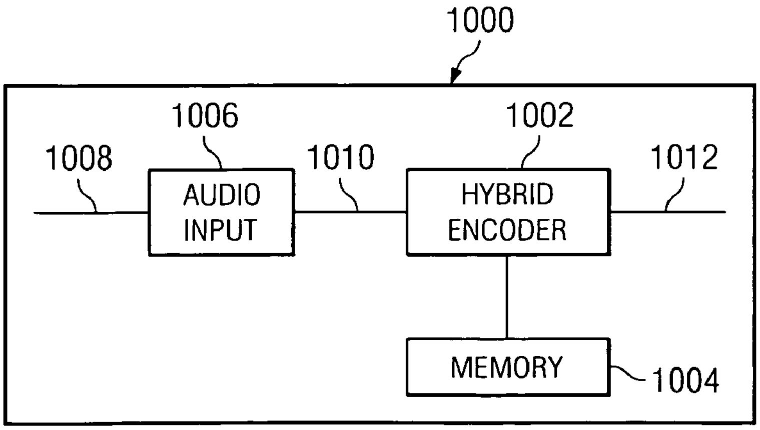
FIG. 10 is a schematic diagram of an audio device according to one embodiment of the present disclosure.

FIG. 10 is a schematic diagram of an audio device 1000 according to one embodiment of the present disclosure. The audio device 1000 includes a hybrid audio encoder 1002 according to one embodiment of the present disclosure. The encoder 1002 operates according to a process stored in a memory 1004; however, it will be understood that in another embodiment, the encoder 1002 may operate according to a method hardwired into the encoder 1002. An input signal 1008 is received by an audio input device 1006. The audio input device 1006 produces an audio signal 1010, which provides an input to the hybrid audio encoder 1002. The hybrid encoder 1002 processes the audio signal 1010 and produces a compressed audio signal 1012.

It may be advantageous to set forth definitions of certain words and phrases used in this patent document. The term "coder" and its derivatives may refer to an encoder. The term "encoder" and its derivative may similarly refer to a coder. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:

receiving an input signal; and downmixing, using an audio encoder, the input signal by calculating a stereo scaling factor in a group level which is definable within a stereo band using an intermediate result comprising at least one of an interchannel intensity difference parameter and an interchannel coherence parameter, the intermediate result operable to preserve the mono energy in a downmixed signal generated from the input signal;

wherein the stereo scaling factor in the group level is calculated as $$\sqrt{\frac{2(A+B)}{C+2D}},$$

where $$A=\sum_{c=0}^{c_{total}-1}\sum_{n=n_c}^{n_{c+1}-1}\sum_{k=k_b}^{k_{b+1}-1} l(k,n)l^*(k,n),$$

$$B=\sum_{c=0}^{c_{total}-1}\sum_{n=n_c}^{n_{c+1}-1}\sum_{k=k_b}^{k_{b+1}-1} r(k,n)r^*(k,n),$$

$$C=\sum_{c=0}^{c_{total}-1}\sum_{n=n_c}^{n_{c+1}-1}\sum_{k=k_b}^{k_{b+1}-1} l(k,n)l^*(k,n)+r(k,n)r^*(k,n)=A+B,$$

$$D=\sum_{c=0}^{c_{total}-1}\sum_{n=n_c}^{n_{c+1}-1}\sum_{k=k_b}^{k_{b+1}-1} \mathrm{Re}(l(k,n)r^*(k,n)),$$

l and r are respectively left and right channel complex subband samples, k is a frequency channel index, n is a subband sample index, b is a stereo band index, c is a time segment, and $C_{total}$ is a number of desired time segments within one frame of the audio signal.

2. The method of claim 1 further comprising:

updating the stereo scaling factor using an update rate; and synchronizing the update rate of the scaling factor with the update rate of a spatial parameter during a fast changing transient portion of the signal.

3. The method of claim 1, wherein calculating the stereo scaling factor is adapted to an available computational resource as a form of scalable quality and complexity.

4. The method of claim 1, wherein the stereo scaling factor is calculated as a function of at least one of: an input sampling frequency and an encoder operating bit rate.

5. The method of claim 1, wherein a first number of groups in a first stereo band is greater than a second number of groups in a second stereo band.

6. The method of claim 5, wherein the first stereo band is a lower frequency stereo band than the second stereo band.

7. The method of claim 5, wherein the first stereo band is perceptually more important than the second stereo band.

8. The method of claim 1, wherein the group level within the stereo band is grouped according to at least one of: a time axis magnitude and a frequency axis magnitude.

9. An audio device, comprising:

an audio input device, operable to receive an input signal and produce an audio signal; and an audio encoder, operable to receive the audio signal and produce a compressed audio signal, wherein the audio encoder is further operable to downmix the audio signal by calculating a stereo scaling factor in a group level which is definable within a stereo band using an intermediate result comprising at least one of an interchannel intensity difference parameter and an interchannel coherence parameter, the intermediate result operable to preserve the mono energy in a downmixed signal generated from the input signal;

wherein the stereo scaling factor in the group level is calculated as $$\sqrt{\frac{2(A+B)}{C+2D}},$$

where $$A=\sum_{c=0}^{c_{total}-1}\sum_{n=n_c}^{n_{c+1}-1}\sum_{k=k_b}^{k_{b+1}-1} l(k,n)l^*(k,n),$$

$$B=\sum_{c=0}^{c_{total}-1}\sum_{n=n_c}^{n_{c+1}-1}\sum_{k=k_b}^{k_{b+1}-1} r(k,n)r^*(k,n),$$

$$C=\sum_{c=0}^{c_{total}-1}\sum_{n=n_c}^{n_{c+1}-1}\sum_{k=k_b}^{k_{b+1}-1} l(k,n)l^*(k,n)+r(k,n)r^*(k,n)=A+B,$$

$$D=\sum_{c=0}^{c_{total}-1}\sum_{n=n_c}^{n_{c+1}-1}\sum_{k=k_b}^{k_{b+1}-1} \mathrm{Re}(l(k,n)r^*(k,n)),$$

l and r are respectively left and right channel complex subband samples, k is a frequency channel index, n is a subband sample index, b is a stereo band index, c is a time segment, and $C_{total}$ is a number of desired time segments within one frame of the audio signal.

10. The audio device of claim 9, wherein the audio encoder is further operable to:

update the stereo scaling factor using an update rate; and synchronize the update rate of the scaling factor with the update rate of a spatial parameter during a fast changing transient portion of the signal.

11. The audio device of claim 9, wherein calculating the stereo scaling factor is adapted to an available computational resource as a form of scalable quality and complexity.

12. The audio device of claim 9, wherein the stereo scaling factor is calculated as a function of at least one of: an input sampling frequency and an encoder operating bit rate.

13. The audio device of claim 9, wherein a first number of groups in a first stereo band is greater than a second number of groups in a second stereo band.

14. The audio device of claim 13, wherein the first stereo band is a lower frequency stereo band than the second stereo band.

15. The audio device of claim 13, wherein the first stereo band is perceptually more important than the second stereo band.

16. The audio device of claim 9, wherein the group level within the stereo band is grouped according to at least one of: a time axis magnitude and a frequency axis magnitude.

17. A non-transitory computer readable medium embodying a computer program, the computer program comprising computer readable program code for:

receiving an input signal; and downmixing, using an audio encoder, the input signal by calculating a stereo scaling factor in a group level which is definable within a stereo band using an intermediate result comprising at least one of an interchannel intensity difference parameter and an interchannel coherence parameter, the intermediate result operable to preserve the mono energy in a downmixed signal generated from the input signal;

wherein the stereo scaling factor in the group level is calculated as $$\sqrt{\frac{2(A+B)}{C+2D}},$$

where $$A=\sum_{c=0}^{c_{total}-1}\sum_{n=n_c}^{n_{c+1}-1}\sum_{k=k_b}^{k_{b+1}-1} l(k,n)l^*(k,n),$$

$$B=\sum_{c=0}^{c_{total}-1}\sum_{n=n_c}^{n_{c+1}-1}\sum_{k=k_b}^{k_{b+1}-1} r(k,n)r^*(k,n),$$

$$C=\sum_{c=0}^{c_{total}-1}\sum_{n=n_c}^{n_{c+1}-1}\sum_{k=k_b}^{k_{b+1}-1} l(k,n)l^*(k,n)+r(k,n)r^*(k,n)=A+B,$$

$$D=\sum_{c=0}^{c_{total}-1}\sum_{n=n_c}^{n_{c+1}-1}\sum_{k=k_b}^{k_{b+1}-1} \mathrm{Re}(l(k,n)r^*(k,n)),$$

l and r are respectively left and right channel complex subband samples, k is a frequency channel index, n is a subband sample index, b is a stereo band index, c is a time segment, and $C_{total}$ is a number of desired time segments within one frame of the audio signal.

18. The computer program of claim 17 further comprising code for:

updating the stereo scaling factor using an update rate; and synchronizing the update rate of the scaling factor with the update rate of a spatial parameter during a fast changing transient portion of the signal.

* * * * *